US010460346B2

(12) United States Patent
Decre et al.

(10) Patent No.: US 10,460,346 B2
(45) Date of Patent: Oct. 29, 2019

(54) APPARATUS FOR MONITORING A PERSON HAVING AN INTEREST TO AN OBJECT, AND METHOD THEREOF

(75) Inventors: Michel Marcel Jose Decre, Eindhoven (NL); Evert Jan Van Loenen, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 2260 days.

(21) Appl. No.: 11/997,174

(22) PCT Filed: Jul. 31, 2006

(86) PCT No.: PCT/IB2006/052603
§ 371 (c)(1),
(2), (4) Date: Jan. 29, 2008

(87) PCT Pub. No.: WO2007/015200
PCT Pub. Date: Feb. 8, 2007

(65) Prior Publication Data
US 2008/0228577 A1    Sep. 18, 2008

(30) Foreign Application Priority Data

Aug. 4, 2005 (EP) .................................. 05107205

(51) Int. Cl.
*G06Q 30/02*    (2012.01)
*G09F 27/00*    (2006.01)
(Continued)

(52) U.S. Cl.
CPC ......... *G06Q 30/0255* (2013.01); *G06Q 30/02* (2013.01); *G06T 7/70* (2017.01);
(Continued)

(58) Field of Classification Search
USPC ............. 705/14.58, 35, 7; 340/573; 600/301
See application file for complete search history.

(56) References Cited

U.S. PATENT DOCUMENTS 4,339,709 A * 7/1982 Brihier ..................... G01B 7/14
324/607
4,836,670 A * 6/1989 Hutchinson ............ A61B 3/113
351/210
(Continued)

FOREIGN PATENT DOCUMENTS

DE    10252697 A1    5/2004
EP    1422923 A2     5/2004
(Continued)

OTHER PUBLICATIONS

Boris M. Velichkovsky, et al: New Technological Windows into Mind: There is More in Eyes and Brains for Human-Computer Interaction, CHI 1996, Vancouver, BC, CA, pp. 496-503.
(Continued)

*Primary Examiner* — Chikaodinaka Ojiaku
(74) *Attorney, Agent, or Firm* — Daniel J. Piotrowski

(57) ABSTRACT

The invention relates to a method of monitoring a person (101) having an interest to an object. The method comprising steps of: (210) providing a data processor (111) for obtaining interaction data related to a remote interaction between the person and at least one of a plurality of the objects (131, 132, 133), (240) using the data processor for analysis of the interaction data to identify a particular one of the objects (133), to which the person has the interest, and (250) obtaining additional data related to the particular object for informing the person about the particular object. The analysis of the interaction data may comprise a step (220) of identifying a remote location where the interest of
(Continued)

the person is focused, and a step (230) of determining locations of the objects with respect to the remote location.

12 Claims, 2 Drawing Sheets

(51) Int. Cl.
*G06T 7/70* (2017.01)
*G06K 9/00* (2006.01)

(52) U.S. Cl.
CPC ......... *G09F 27/00* (2013.01); *G06K 9/00597* (2013.01); *G06T 2207/30196* (2013.01)

(56) References Cited

U.S. PATENT DOCUMENTS

| | | | |
|---|---|---|---|
| 4,930,236 A | 6/1990 | Hart | |
| 5,335,169 A * | 8/1994 | Chong | G06Q 40/02 705/31 |
| 5,604,818 A * | 2/1997 | Saitou | G06T 7/97 348/78 |
| 5,686,942 A * | 11/1997 | Ball | G06F 3/012 345/158 |
| 5,761,648 A * | 6/1998 | Golden | G06Q 20/045 705/14.36 |
| 5,912,721 A | 6/1999 | Yamaguchi et al. | |
| 5,918,211 A * | 6/1999 | Sloane | 705/16 |
| 6,118,888 A | 9/2000 | Chino et al. | |
| 6,152,563 A * | 11/2000 | Hutchinson | A61B 3/113 351/209 |
| 6,262,717 B1 * | 7/2001 | Donohue | G06F 3/03547 345/173 |
| 6,393,136 B1 * | 5/2002 | Amir | G06F 3/011 348/14.01 |
| 6,442,530 B1 | 8/2002 | Miller | |
| 6,453,194 B1 * | 9/2002 | Hill | A61B 5/0488 128/898 |
| 6,456,262 B1 * | 9/2002 | Bell | 345/8 |
| 6,675,040 B1 * | 1/2004 | Cosman | G06T 3/00 600/427 |
| 6,717,522 B1 | 4/2004 | Nagatomo | |
| 6,758,563 B2 * | 7/2004 | Levola | A61B 3/113 351/209 |
| 6,919,907 B2 * | 7/2005 | Berstis | H04N 5/23206 345/619 |
| 6,961,712 B1 * | 11/2005 | Perkowski | G06Q 30/02 705/26.62 |
| 7,313,538 B2 * | 12/2007 | Wilmes | G06Q 20/207 705/19 |
| RE40,014 E * | 1/2008 | Edwards | A61B 3/0025 351/209 |
| 7,590,261 B1 * | 9/2009 | Mariano | G06K 9/00785 382/103 |
| 7,860,746 B1 * | 12/2010 | Fitch | G06Q 20/207 705/19 |
| 7,931,602 B2 * | 4/2011 | Kayahara | G06T 7/00 600/558 |
| 7,986,816 B1 * | 7/2011 | Hoanca | G06K 9/00892 382/115 |
| 8,013,838 B2 * | 9/2011 | Hsu | G06F 3/011 345/157 |
| 8,077,914 B1 * | 12/2011 | Kaplan | A61B 3/113 382/103 |
| 8,102,465 B2 * | 1/2012 | Nakao | H04N 5/2256 348/370 |
| 8,195,507 B2 * | 6/2012 | Postrel | G06Q 20/105 705/14.27 |
| 8,339,446 B2 * | 12/2012 | Blixt | A61B 3/113 348/78 |
| 2002/0072974 A1 * | 6/2002 | Pugliese et al. | 705/14 |
| 2002/0184098 A1 * | 12/2002 | Giraud et al. | 705/14 |
| 2003/0016211 A1 * | 1/2003 | Woolley | G06F 3/04886 345/173 |
| 2003/0031334 A1 * | 2/2003 | Layton | H04R 27/00 381/310 |
| 2003/0156257 A1 * | 8/2003 | Levola | A61B 3/113 351/210 |
| 2003/0169906 A1 * | 9/2003 | Gokturk | G06K 9/00201 382/115 |
| 2004/0001616 A1 | 1/2004 | Gutta et al. | |
| 2004/0003409 A1 * | 1/2004 | Berstis | H04N 5/23206 725/105 |
| 2004/0005083 A1 * | 1/2004 | Fujimura | A61B 3/113 382/103 |
| 2004/0019541 A1 * | 1/2004 | William | G06Q 10/10 705/31 |
| 2004/0044574 A1 * | 3/2004 | Cochran et al. | 705/14 |
| 2004/0156020 A1 * | 8/2004 | Edwards | G06F 3/013 351/209 |
| 2004/0172328 A1 * | 9/2004 | Fukui | G06Q 30/02 705/14.4 |
| 2004/0193313 A1 * | 9/2004 | Cornet | G06Q 30/02 700/231 |
| 2005/0010475 A1 * | 1/2005 | Perkowski | G06Q 30/02 705/14.51 |
| 2005/0073136 A1 * | 4/2005 | Larsson | A61B 3/113 280/735 |
| 2005/0080671 A1 * | 4/2005 | Giraud | G06Q 30/02 705/14.66 |
| 2005/0168700 A1 * | 8/2005 | Berg | B41F 33/0036 353/34 |
| 2005/0228718 A1 * | 10/2005 | Austin | G06Q 30/00 705/14.19 |
| 2005/0251408 A1 * | 11/2005 | Swaminathan et al. | 705/1 |
| 2006/0120573 A1 * | 6/2006 | Iori | G06K 9/0002 382/124 |
| 2006/0208070 A1 * | 9/2006 | Kato | G06Q 20/203 235/383 |
| 2007/0038931 A1 * | 2/2007 | Allaire | G06Q 30/0239 715/206 |
| 2007/0087834 A1 * | 4/2007 | Moser | G06Q 30/02 463/42 |
| 2007/0150916 A1 * | 6/2007 | Begole et al. | 725/10 |
| 2008/0065468 A1 * | 3/2008 | Berg | G06Q 30/02 705/7.32 |
| 2008/0154754 A1 * | 6/2008 | William | G06Q 10/00 705/31 |
| 2008/0252850 A1 * | 10/2008 | Plagwitz | A61B 3/113 351/210 |
| 2009/0265244 A1 * | 10/2009 | Marmour | G06Q 30/0261 705/14.58 |

FOREIGN PATENT DOCUMENTS

| | | |
|---|---|---|
| JP | 2003271084 A1 | 9/2003 |
| JP | 2004258928 A | 9/2004 |
| JP | 2004259241 A1 | 9/2004 |
| JP | 2004326208 A1 | 11/2004 |
| JP | 2004348618 A | 12/2004 |
| JP | 2005056117 A1 | 3/2005 |
| WO | 9926126 A1 | 5/1999 |
| WO | WO 2008093721 A1 * | 8/2008 ............ G06F 19/00 |

OTHER PUBLICATIONS

Zhiwei Zhu et al, "Eye and gaze tracking for interactive graphic display" Machine Vision and Applications (2004) 15: 139-148, Digital Object Identifier (DOI) 10.1007/s00138-004-0139-4.

* cited by examiner

210 — Using a data processor for obtaining interaction data related to a remote interaction between the person and at least one of a plurality of the objects;

220 — using the data processor for analysis of the interaction data to identify a remote location where the interest of the person is focused;

230 — using the data processor for determining locations of the objects with respect to the remote location of interest of the person;

240 — using the data processor to identify a particular one of the objects on the basis of the remote location of interest and the locations of the objects;

250 — obtaining additional data related to the particular object for informing the person about the particular object;

FIG. 2

APPARATUS FOR MONITORING A PERSON HAVING AN INTEREST TO AN OBJECT, AND METHOD THEREOF

The invention relates to a method of monitoring a person having an interest to an object, and an apparatus for monitoring a person having an interest to an object. The invention also relates to a system comprising the apparatus, and a computer program product.

JP2003/271084 discloses a system, located inside a bookstore, for monitoring potential customers passing by a window of the bookstore. The system comprises a camera and a display which are connected to a central processing unit (processor). The camera is configured to acquire images of the customers and supply the images to the processor. The processor is configured to process the images and respectively control the camera and the display. The processor is also configured to determine from the images a sex and age of the potential customer. The display is installed at the window of the bookstore so that the customers may see information on the display from outside of the bookstore. The processor is able to compute a center line of a face of the customer to determine a direction of a look of the customer. If the processor determines that the customer looks in the direction of the window of the bookstore, the processor will automatically control the display to display information, such as a list of magazines on sale, in accordance with the sex and age of the customer.

The known system has a disadvantage that it inappropriately provides the information to the potential customers, e.g. due to a way in which the images of the monitored customers are processed and a way in which the information is selected for the presentation. The potential customer merely sees the information pre-selected for the determined sex and age, whereas that information may better haven't been presented to the customer, e.g. because the age was wrongly determined or the information is not preferred by the customer who wanted to see another information on the display.

It is desirable to provide such a method of monitoring a person having an interest to an object, that information is efficiently selected for presenting to the person. The person should be monitored so that suitable information for the person is accurately selected.

The method of the present invention comprises steps of:
 providing a data processor for obtaining interaction data related to a remote interaction between the person and at least one of a plurality of the objects,
 using the data processor for analysis of the interaction data to identify a particular one of the objects, to which the person has the interest, and
 obtaining additional data related to the particular object for informing the person about the particular object.

For example, the analysis of one or more images supplied as the interaction data to the data processor allows to determine a position of the person with respect to the objects. The data processor may determine from at least one of the images that the person looks in a particular direction. The particular object may be identified from the direction of the person's look and the position of the person. When it is known that the person is interested specifically in the particular object, a further presentation of information or a further user interaction may be focused with respect to the identified particular object. The additional data match accurately the interest of the person when the person is monitored, because specific information may be shown to the person unequivocally related to the particular object. For example, there are no doubts about interests of the person if the particular object is specifically looked at through a shop window (for a certain amount of time).

In the system known from JP2003/271084, it is just determined whether the person looks at the display in general. For example, the system is not able to derive in which magazine the person is interested. The system may only display the list of magazines that the person would be interested if the age is determined correctly. The whole content of the display is adapted to the potential customer. In any case, the known system does not allow to detect a specific interest of the potential customer in any of the displayed magazines.

The apparatus of the present invention comprises a data processor for
 obtaining interaction data related to a remote interaction between the person and at least one of a plurality of the objects,
 analysing of the interaction data to identify a particular one of the objects, to which the person has the interest,
 obtaining additional data related to the particular object for informing the person about the particular object.

The apparatus allows to identify the particular object in which the person is interested, and provide corresponding information about the particular object. The apparatus may function in accordance with the method of the present invention.

These and other aspects of the invention will be further explained and described, by way of example, with reference to the following drawings:

FIG. 2 is an embodiment of the method of the present invention.

Figure 1:
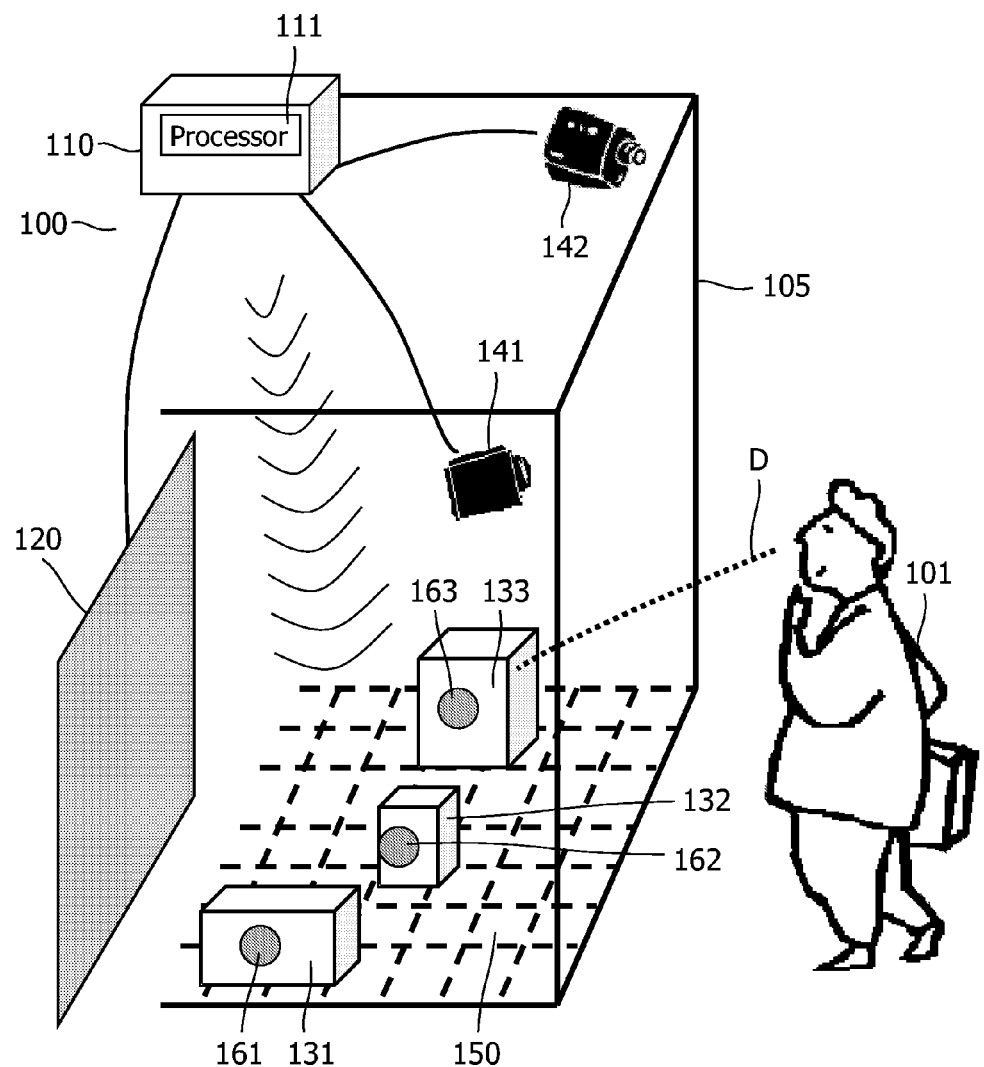
FIG. 1 is a functional block diagram of an embodiment of the system according to the present invention.

One of possible implementations of the present invention provides for a system 100 for monitoring a person 101 near a shop window 105 as shown in FIG. 1. The system 100 comprises an apparatus 110 for monitoring the person 101 who may be a potential customer of a shop, a presentation unit such as a display screen 120 for displaying information about objects, e.g. products on sale 131, 132 and 133 visible to the person 101 through the shop window 105, and one or more monitoring units such as cameras 141 and 142.

The system 100 shown in FIG. 1 is arranged in a shop area separated from the person 101 by the shop window 105. However, the system may also be arranged to monitor the person being inside the shop area.

The cameras 141 and 142 may be adapted to capture video data so that an area in front of or around the products 131, 132 and 133 is covered. For example, if the person 101 is close to the shop window 105, the person will also be in the area monitored by the cameras 141 and 142. Further, the cameras may stream the video data to the apparatus 110 in a real time mode.

The apparatus 110 may comprise a data processor 111 (further referred to as "processor") for obtaining the video data supplied by the cameras 141 and 142. The video data may show whether there is a "remote interaction" between the person 101 and at least one of the products 131, 132 and 133. The remote interaction may concern the person 101 standing at gaze towards one of the products, the person 101 pointing with a finger at one of the products, a conversation between the person 101 and another customer (not shown) about one of the products, and a person's touch of the shop window 105. The remote interaction concerns behaviour of the person 101, and the person does not have to use any additional electronic gadgets for the interaction.

The apparatus 110 may additionally comprise a memory unit (not shown), for example, a known RAM (random access memory) memory module. The processor 110 may be arranged to read from the memory unit at least one instruction to enable the functioning of the apparatus.

The processor 111 may perform an analysis of the video data to detect a direction D of a look and a position of the person 101. The analysis may involve a method of detecting a position and inclination of a person's head as disclosed in JP2003/271084. Alternatively, eye-tracking methods may be used that exploit a relation of a person's gaze to a relative position of a pupil of an eye of the person. The methods may additionally use a bright eye effect which is a result of the highly reflective nature of a retina of the eye. A significant amount of light entering the eye is reflected through the pupil.

In one of the embodiments, the processor 111 is configured to carry out an image analysis algorithm for detecting a direction (not shown) pointed by the finger of the person 101. The finger pointing method may add reliability to the eye gaze analysis. The directions determined with the finger pointing method and the eye gaze analysis may be compared to derive, for example, an "average" direction indicated by the person 101 to one of the products 131, 132 and 133.

Once, the direction of the person's look and the position of the person are determined, information about locations of the products 131, 132 and 133 is obtained to determine an intersection of the direction of the person's look with one of the products.

There are many ways to detect the locations of the products. One of the options is to use a grid 150 of detectors (e.g. active RFID antenna's) for detecting RFID tags 161, 162 and 163 attached to the corresponding products 131, 132 and 133. Many warehouses use some kind of RFID tags to tag their products anyway. The RFID tags 161, 162 and 163 according to the present invention may also store identifiers of the respective products 131, 132 and 133. The identifiers may provide a name of a product, its price or simply a unique code of the product. In a special embodiment, the RFID tags store information to be used for presenting the corresponding products to the person 101 by means of the display screen 120. For example, the RFID tag may store a trigger for activating an illumination of the corresponding product.

Another way to ascertain the locations of the products is to use an interaction map (not shown) for defining the locations. A sales agent of the shop may user-operably define the locations on the map using the apparatus 110. For example, the apparatus 110 may have a user interface for enabling the sales agent to assign the product locations. The apparatus may store the map and use it for finding the coordinates of the products.

Using the detectors grid 150, coordinates of the products 131, 132 and 133 and their identifiers are obtained and supplied to the apparatus 110. Further, the data processor 111 may compare the coordinates of the products 131, 132 and 133 with the direction D of the person's look and with the position of the person 101. The comparison may reveal a particular one of the products at which the person 101 looks, for example the product 133. In this way, the data processor may identify the particular product 133 and its identifier.

Having obtained the identifier of the particular product, the data processor 111 may use the code from the identifier to query a product database (not shown) for storing additional data related to the particular product 133. The additional data may comprise media content data describing a technical specification of the particular product, or a video clip for promoting the particular product, etc.

The additional data, e.g. the media content data, are displayed on the display screen 120. The person 101 may see information about the particular product immediately after the person looked at the particular product or pointed at with the finger.

The media content data may comprise at least one of, or any combination of, visual information (e.g., video images, photos, graphics), audio information, text information, and other digital data such, e.g., meta-data according to the MPEG-7 standard which may be used to describe and search digitized materials by means of sampling, as well as by using lexical search terms.

According to an embodiment, the shop area, where the products 131, 132 and 133 are located, may be provided with one or more microphones (not shown) for generating audio data and supplying the audio data to the processor 111. The audio data may concern a conversation between persons in front of the products, or voice commands of the person 101. The processor 111 may extract from the audio data key words which relate to the products. The key words may be predetermined, e.g. "TV", "DVD player", "home cinema system", or a heuristic speech analysis algorithm may be applied for extracting parts of the audio data that are possibly relevant to the products. The processor 111 may use the keywords or text recognised in the relevant speech from the audio data to query the product database for finding one of the products 131, 132 and 133 that is probably described in the conversation or referred by the person 101. Thus, the particular object 133 may be identified.

In another embodiment, the particular object is identified through a detection of one or more touches of the person 101 with the shop window 105. The shop window may incorporate a grid with e.g. capacitive touch detectors (not shown) or another type of touch detector for detecting a position of the touches on the shop window. The touch detector may send touch input data with the touch position to the processor 111. The processor may project the touch position onto the coordinates of the products 131, 132 and 133 to determine which product is the closest to the touch on the window. For example, the closest product is the identified particular product 133.

Advantageously, the apparatus 110 may be coupled to a proximity detector (not shown) for sensing whether the person 101 is near the shop window 105. The proximity sensor may be installed at the shop window. The proximity sensor may generate an activation signal when the person 101 is detected in front of the shop window. Upon a receipt of the activation signal, the processor 111 may initiate the process of monitoring the person.

The display screen 120 may be substituted with other means for informing the person about the particular object. For example, the system 100 may comprise automatic movable projectors for illuminating the particular object. As a result, the person who is interested in the particular object may better see the illuminated particular object. Alternatively, the products 131, 132 and 133 may be positioned on rotatable platforms. The apparatus 110 may individually control one of the platforms to rotate the corresponding one of the products identified as the particular object. In another example, the display screen 120 is replaced by a projector (not shown) for projecting the additional data about the particular product on the shop window 105. The shop window may have a special structure suitable for displaying the projected additional data.

The embodiment shown in FIG. 1 may also be adapted to a library, exhibition, museum or another public place where physical items are demonstrated to the public. However, the invention is not limited to the identification of the physical items. For example, the embodiment shown in FIG. 1 may find its application for advertising products on-line, e.g. in an Internet shop. The display screen 120 may visually display the products, so that the products need not be physically present between the shop window and the display screen as in FIG. 1. The eye-gaze detection and the finger pointing may be applied to remotely detect the interest of the person 101 in one of the displayed products. Once the particular product of interest to the person 101 is identified, the display screen 120 may display the additional information about the particular product.

FIG. 2 illustrates an embodiment of a method of the present invention. The embodiment comprises a step 210 of using the processor 111 for obtaining the interaction data, e.g. the video data supplied by the cameras 141 and 142, the audio data generated by the microphone, or the touch input data with the position of the touch by the person 101. In step 220, the direction D of the eye-gaze of the person 101 is detected, and the position of the person 101 is determined from the video data. Alternatively or additionally, the finger pointing method allows for detecting a direction (not shown) pointed by the finger of the person 101; or the keywords or the recognised speech is extracted from the audio data. According to step 230, the locations of the objects are determined. For example, the grid 150 of the RFID detectors is used for detecting the RFID tags 161, 162 and 163. The interaction map indicating the locations of the products may also be used. In step 240, the particular object 133 is identified based on the remote location of interest, e.g. the location corresponding to the direction of the person's look or the direction pointed at by the finger, and the location of the products 131, 132 and 133. In one of the embodiments, the steps 230 and 240 correspond to the use the keywords or the recognised speech from the audio data to query the product database for finding one of the products 131, 132 and 133 that is probably described in the conversation or referred by the person 101. Finally, step 250 provides for obtaining the additional data. According to the additional data, the particular object is illuminated, rotated or displayed on the display screen together with additional information about the particular object.

The method allows to adjust the presentation of the objects demonstrated to the person by changing only the presentation of the particular object which is of interest to the person. Thus, the presentation of the particular object is personalized. This may create a advantageous effect on the perception of the particular object 133 by the person 101. The invention allows for intuitive and easy interaction between the system 100 and the person 101, so that the person 101 receives interesting information without any additional devices to interact with the system.

In a further embodiment of the method, the apparatus 110 may identify more than one particular object over a certain time period. The person 101 may like to first look briefly over the whole range of products 131, 132 and 133, and then decide on one of the products that is most interesting. For such situations, the apparatus 110 may be configured to count time that the person 101 looked at one of the products 131, 132 and 133, time that the person 101 pointed to one of the products, etc. While the person 101 changes the attention from one product to another product, the apparatus may control the display screen 120 to display the additional data for the corresponding product. As a next step, the apparatus may find one of the products that received the longest time. Thus, the apparatus 110 identifies a further particular object. In one example, the apparatus further causes the display screen 120 to display more detailed additional information about the further particular product. The apparatus may also generate an audible or visual signal for the sales agent that the potential customer may be about to decide on a purchase of the further particular product. Alternatively, the apparatus may cause the display screen 120 to display a message inviting the person 101 to enter the shop for a further assistance.

Variations and modifications of the described embodiment are possible within the scope of the inventive concept. For example, in one embodiment, the system according to the present invention is implemented in a single device, or it comprises a service provider and a client. Alternatively, the system may comprise devices that are distributed and remotely located from each other. In another embodiment, the apparatus 110 may be adapted to search for the additional data about the particular product using an Internet search engine.

The processor may execute a software program to enable the execution of the steps of the method of the present invention. The software may enable the apparatus of the present invention independently of where it is being run. To enable the apparatus, the processor may transmit the software program to the other (external) devices, for example. The independent method claim and the computer program product claim may be used to protect the invention when the software is manufactured or exploited for running on the consumer electronics products. The external device may be connected to the processor using existing technologies, such as Blue-tooth, IEEE 802.11[a-g], etc. The processor may interact with the external device in accordance with the UPnP (Universal Plug and Play) standard.

A "computer program" is to be understood to mean any software product stored on a computer-readable medium, such as a floppy disk, downloadable via a network, such as the Internet, or marketable in any other manner.

The various program products may implement the functions of the system and method of the present invention and may be combined in several ways with the hardware or located in different devices. The invention can be implemented by means of hardware comprising several distinct elements, and by means of a suitably programmed computer. In the device claim enumerating several means, several of these means can be embodied by one and the same item of hardware.

The invention claimed is:

1. A method of monitoring a person having an interest in a physical object in an area, the method comprising steps of:
  monitoring the person by at least one video camera,
  obtaining interaction data from said at least one video camera, the interaction data relating to an interaction between the person and at least one of a plurality of three-dimensional, physical objects, wherein the person does not have physical contact with the physical objects, and wherein each of said at least one cameras is physically detached from each of the plurality of three-dimensional physical objects,
  analyzing the interaction data by a data processor to identify a particular one of the physical objects to which the person has the interest, wherein said analyzing step comprises determining a direction (D) of a person's look and an intersection of the direction with the particular object using a grid of detectors in the area to detect an identifier on the physical object, obtaining additional data related to the identified particular physical object for immediately informing the person about the identified particular physical object, wherein said obtaining additional data step is performed without any further action by the person, and providing the additional data to the person.

2. The method of claim 1, wherein said analyzing step comprises:
a step of identifying a remote location where the interest of the person is focused, and
a step of determining locations of the objects with respect to the remote location.

3. The method of claim 1,
wherein said obtaining step further comprises any one or a combination of:
a step of using at least one microphone for obtaining audio data as additional interaction data related to the remote interaction, and providing the audio data to the data processor,
a step of using a touch detector for obtaining touch input data as additional interaction data related to the remote interaction, the touch detector being remote to the objects, and providing the touch input data to the data processor, and
wherein said analyzing step further comprises analyzing at least some of the additional interaction data.

4. The method of claim 1, wherein more than one particular object is identified, further comprising a step of determining a further particular object out of the particular objects, the further particular object having attracted most of the person's interest.

5. The method of claim 1, wherein said providing step comprises displaying the additional data on a display.

6. The method of claim 1, wherein one or more of the physical objects are visible to the person.

7. The method of claim 6, further comprising a step of using the additional data for actively demonstrating the particular object to the person through an illumination or physical motion of the particular object.

8. The method of claim 6, wherein the physical objects are located in a shop area.

9. A method of monitoring a person having an interest in physical objects in an area, the method comprising steps of:
monitoring the person by at least one video camera,
obtaining interaction data from said at least one video camera, the interaction data relating to an interaction between the person and at least one of a plurality of three dimensional, physical objects, wherein the person does not have physical contact with the physical objects, and wherein each of said at least one cameras is physically detached from each of the plurality of three-dimensional physical objects,
analyzing the interaction data by a data processor to identify a particular one of the physical objects to which the person has the interest, wherein said analyzing step comprises determining a direction (D) of a person's look and an intersection of the direction with the particular physical object, wherein locations of the physical objects are coordinately defined on an interaction map, and wherein the map and direction are used to determine the particular physical object,
obtaining additional data related to the identified particular physical object for immediately informing the person about the identified particular physical object, wherein said obtaining additional data step is performed without any further action by the person, and providing the additional data to the person.

10. A system for monitoring a person having an interest in a physical object, the system comprising:
at least one video camera for obtaining interaction data relating to an interaction between the person and at least one of a plurality of three-dimensional, physical objects, wherein the person does not have physical contact with the physical objects, and wherein each of said at least one cameras is physically detached from each of the plurality of three-dimensional physical objects, and
a data processor for
analyzing the interaction data to identify a particular one of the objects to which the person has the interest, wherein said analyzing function comprises determining a direction (D) of a person's look and an intersection of the direction with the particular object using a grid of detectors in the area to detect an identifier on the physical object, and
obtaining and providing additional data related to the identified particular physical object for immediately informing the person about the identified particular physical object.

11. The system of claim 10 further comprising any one or a combination of:
a microphone for obtaining audio data as additional interaction data related to the interaction, and providing the audio data to the data processor,
a touch detector for obtaining touch input data as additional interaction data related to the interaction, and providing the touch input data to the data processor.

12. A method of monitoring a person having an interest to an object, the method comprising steps of:
by a data processor, obtaining interaction data related to a remote interaction between the person and at least one of a plurality of objects, and analyzing the interaction data to identify a particular one of the objects to which the person has the interest, and
by the data processor, obtaining additional data related to the particular object to provide additional data to the person,
wherein the interaction data comprises touch data indicative of one or more touches by the person to a window located in front of the plurality of objects, and
wherein identifying the particular object comprises detecting a position of touches on the window based on the touch data and then projecting the touch position onto coordinates of the objects to identify the particular object.

* * * * *